United States Patent [19]
Hunter et al.

[11] 3,864,505
[45] Feb. 4, 1975

[54] METHOD OF SHAPING FRIED FARINACEOUS DOUGH PRODUCTS AFTER REMOVAL FROM THE FRYING MEDIUM

[75] Inventors: John Earl Hunter, Springfield Township, Hamilton County; Alexander Leon Liepa, Montgomery, both of Ohio

[73] Assignee: The Procter & Gamble Company, Cincinnati, Ohio

[22] Filed: May 28, 1974

[21] Appl. No.: 473,861

Related U.S. Application Data

[63] Continuation of Ser. No. 294,730, Sept. 29, 1972, abandoned.

[52] U.S. Cl. .............. 426/346, 426/347, 426/439, 426/441, 426/459, 426/512
[51] Int. Cl. ............................................. A23l 1/10
[58] Field of Search.... 426/343, 346, 347, 438–441, 426/512, 514, 516, 517

[56] References Cited
UNITED STATES PATENTS

| | | | |
|---|---|---|---|
| 2,286,644 | 6/1942 | Pringle | 426/517 |
| 2,611,705 | 9/1952 | Gendel | 426/438 |
| 3,132,949 | 5/1964 | Crowe | 426/439 |
| 3,149,978 | 9/1964 | Anderson | 426/439 |
| 3,259,503 | 7/1966 | Tan | 426/439 |
| 3,545,979 | 12/1970 | Ghafoori | 426/347 |

FOREIGN PATENTS OR APPLICATIONS 408,368  4/1934  Great Britain

*Primary Examiner*—Jack Sofer
*Assistant Examiner*—Martin G. Mullen

[57] ABSTRACT

Snack foods prepared from farinaceous doughs are shaped into any desired shape after complete frying and removal from the frying medium during a fleeting moment of flexibility before the dough becomes rigid.

17 Claims, No Drawings

3,864,505

METHOD OF SHAPING FRIED FARINACEOUS DOUGH PRODUCTS AFTER REMOVAL FROM THE FRYING MEDIUM

CROSS-REFERENCE TO RELATED APPLICATIONS

This application is a continuation of commonly assigned copending application, Ser. No. 294,730; filed Sept. 29, 1972 and now abandoned.

BACKGROUND OF THE INVENTION

Snack food products prepared from vegatable and/or cereal grains or other farinaceous materials have become increasingly popular in recent years. Typically, these products are prepared by preparing a moisturized dough from a farinaceous material, shaping the dough by extruding, sheeting, and the like coupled with cutting, and thereafter frying in hot fat while constrained so as to avoid shape distortion.

In a typical example, for making saddle-shaped uniform shape potato chips from dehydrated potato doughs, cut pieces of potato dough material are maintained in a saddle shape by carriers while continuously conveyed through a deep fat frying zone. Since the potato chips are constrained into a saddle shape during frying, there is no room for expansion or distortion of that shape, and the resulting product is a uniform saddle-shaped chip. For further particulars with regard to such uniform shaped chips see U.S. Pat. No. 3,576,647. Generally, in accord with this patent, a potato dough is made from dehydrated potatoes; the dough may be passed through roller mills to provide a sheet of a certain specified thickness; the sheet is cut into oval shapes; the oval shapes are constrained between mating molds and conveyed through a deep fat fryer and thereafter released, at which point the fried chip retains the shape of the molds. The concept of constraining to conform to a particular shape during frying requires extensive and expensive machinery. Nevertheless, since in the eye of the consumer the geometric shape of snack food items is very important, it is deemed desirable to control the shape and one excellent and highly functional method of so doing is by constraining during frying.

However, in order to provide maximum processing flexibility it would be desirable to provide other means of controlling snack food product shape rather than relying solely upon constraining during frying. Accordingly, it is an object of this invention to provide means of controlling snack food product shape which do not involve constraining during frying. More specifically, the object of this invention is to provide a method of controlling product shape which does not involve constraining during frying but instead shapes after completion of the frying cycle.

Surprisingly, it has been found that fried snack food products prepared from farinaceous dough materials are, for a fleeting moment, after complete frying, flexible. This fleeting moment of flexibility can be used advantageously to conform the fried food into any specifically desired shape. This phenomena has not been heretofore appreciated, and is very significant when considering the prior art. For example, Anderson, U.S. Pat. No. 3,149,978, issued Sept. 22, 1964, teaches in column 1, lines 63–66, "the desired configuration cannot be accomplished after the chips have been removed from the deep fat for they would break." Additionally, see Hendel, U.S. Pat. No. 2,611,705, issued September 23, 1952, which describes that chip or snack-type products are flaccid only after partial frying. Thus, the prior art has not recognized the significant fact that totally fried snack food products can thereafter be shaped without accompanying product breakage.

SUMMARY OF THE INVENTION

This invention relates to preparing snack food items from farinaceous doughs and to a method of controlling the desired shape and/or configuration of the resulting snack food item. In particular, the invention relates to the discovery that farinaceous dough material after complete frying is for a fleeting moment flexible. This fleeting moment of flexibility, if used advantageously, can allow for conforming the snack food item into any particular desired shape.

Such a process, i.e. shaping after complete frying, has the advantage over other processes teaching constraining during frying in order to control geometric shape in that it allows for the fry cycle to be completed without employing expensive mechanical apparatuses. Various methods of shaping after complete frying can be employed in accord with this invention. For example, compressing forces can be applied to fried portions of farinaceous dough by oppositely disposed mating molds positioned at the top and the bottom of a stack of fried dough portions; a stamping and cutting device can be applied to a portion of fried dough to quickly shape after complete frying; fried pieces of cut dough material can be shaped by forcing them via suction molds into a conforming geometric shape, and the like.

DETAILED DESCRIPTION OF THE INVENTION

The snack food market is a greatly expanding market. Such snack food items are generally prepared from farinaceous dough material and appear in the marketplace in a variety of geometric shapes. In particular, products presently appear on the market in the shape of flowers, the shape of a horn of plenty, a uniform saddle shaped potato chip, curled corn chips, rippled chips, disc-shaped chips, and a myriad of other geometric shapes. While all of these products differ significantly in appearance and in some cases taste, they all have in common the fact that they are prepared from farinaceous dough materials and rely upon geometric shape as one of their unique features. Indeed, the number of design patents consistently issuing on snack food items shows the importance of geometric shape in this industry.

The phrase "farinaceous dough" as that phrase is utilized herein is intended to incorporate by definition all dough materials which are based on starch-containing products. Typical examples are corn, potatoes, wheat, rice, barley, rye, cassava, tapioca, oats, and mixtures thereof, as well as other products. These products are distinguished from flours such as soy flour which contain essentially no starch materials. Of course the selection of any particular farinaceous material for use in accord with this invention is a mere matter of choice.

Surprisingly, it has not been heretofore recognized that completely fried farinaceous dough material is flexible for a fleeting moment after frying. In particular, for a brief few seconds, generally for about 20 seconds after complete frying, the chip material is flexible. The precise time of flexibility is dependent upon the degree of dehydration of the dough during frying and the moisture content. Longer fry times remove more dough moisture and necessitate faster shaping. For fry times of from up to 30 seconds, shaping can be accomplished as long as 15 to 20 seconds after frying. However for longer fry times such as above 40 seconds, shaping should be within 5 seconds of frying. This period of flexibility can be taken advantage of in order to shape the fried farinaceous material into any specifically desired geometric shape.

While it is not known precisely why this phenomenon of fleeting flexibility exists, it is believed that at least one reason is the behavior of starch molecules. Farinaceous material by definition contains starch molecules. These complex molecular structures when placed in contact with moisture to form a doughlike material, and during heating, begin to form a gel. Gelatinization (swelling and loss of crystalline character of the starch granules) is further increased during heating in the frying process such that the starch granules lose their crystalline structure and release amylose molecules. Subsequent to frying the amylose molecules become bonded to one another by hydrogen bonding. Once hydrogen bonding between amylose molecules has occurred, rigidity of structure, and crispness sets in. Thus, the process of this invention is believed to take advantage of the fleeting moment subsequent to release of amylose molecules, and after completion of frying, but prior to completion of hydrogen bonding between amylose molecules. This condition typically exists for up to about 20 seconds after complete frying.

Complete frying as utilized herein is determined by measuring the moisture level of the farinaceous fried material. Farinaceous dough material, as explained hereinafter, generally contains from 20 to 70 percent by weight of moisture. During frying, since the temperature is above the boiling point of water, the water is evaporated away from the farinaceous material. Thus, measuring the amount of water in the fried product is in fact a measure of the completeness of frying. The higher the moisture level, the more incomplete the frying; or, stated in the reverse, the lower the moisture level, the more complete the frying process. Complete frying, as that term is utilized herein, designates products having a moisture content of 12 percent or less, and generally within the range from about 1 to about 5 percent by weight. Products fried for times sufficient to provide less than 1 percent moisture are difficult to shape. In addition to the moisture specified herein, a completely fried snack product is characterized by complete cooking and, at least after the period of flexibility, product rigidity and crispness.

Turning now to a particular description of this process as applied to a specific product, i.e. potato chips made from dehydrated potato dough. Dehydrated potatoes and water are mixed to provide a coherent workable dough mixture suitable for frying to provide snack chips. The moisture level is within the range of from 20 to 70 percent by weight of the total dough mixture in order to provide a coherent workable dough mixture having the consistency approximately of bread dough. At moisture levels in excess of 70 percent there is insufficient cohesiveness to provide a coherent dough mixture of suitable structural integrity. On the other hand, at moisture levels below about 20 percent difficulty is encountered in formation of uniformly cooked and shaped product. Preferred moisture levels are from 30 to 60 percent by weight of the dough mixture.

Next in this potato chip preparation, the moisture-adjusted coherent dough mix is sheeted. While sheeting can conceivably be accomplished by extruding, slicing, and stamping, it is usually accomplished by a roll milling operation. In this process the coherent dough mixture having a proper moisture content is fed into a roller mill and passed therethrough to provide a coherent workable dough sheet. Where the proper moisture content, as specified previously, is employed, one pass through a roller mill is sufficient to provide a coherent workable dough sheet. While additional roller milling at times may be necessary to form a good dough sheet, it has been found preferable to employ only the minimum number of roller mill passes. This is so because it has been found that the more work input put into the dough sheet, the greater will be the potential for flavor loss.

Sheet thickness is a matter of practical importance. Generally, very thin sheets will give a less intense potato flavor because the increased work input necessary to form thin sheets causes some cellular impairment; conversely, the thicker the sheet, the more intense is the potato flavor. However, very thick sheets result in a fried chip of poor eating quality because uneven frying often occurs resulting in chips burned at the edges and raw in the center. Preferred sheet thicknesses are from 0.010 inch to 0.040 inch, and most preferably, from 0.014 inch to 0.030 inch.

After sheeting is accomplished, the sheet may be cut into any desired shape, size portioned, and fried in hot frying fat to provide a snack food chip. If frying is conducted without constraining during frying, and without subsequent shaping in accord with the process of this invention, the product will be a random shaped product. On the other hand, if frying is controlled carefully by constraining sized pieces of dough sheet between mating molds, the final shape of the product will be rigidly controlled as shown in U.S. Pat. No. 3,576,647 issued Apr. 27, 1971.

Generally, frying in hot vegetable oil is conducted at temperatures above 212°F, with the specific temperature and time employed dependent upon the farinaceous material from which the original dough is made. For example, with production of potato chips from dehydrated potatoes frying in hot vegetable oil is conducted at temperatures of from 300°F to 375°F for from 5 seconds to 60 seconds, with from 7 to 15 seconds being most preferred. Frying times within this most preferred range are quite short because short fry times destroy less of the naturally present potato reducing sugar content which therefore results in a chip with a slightly sweeter flavor note. Frying for times within the above specified ranges at temperatures as specified above will generally provide a product having a moisture content of 3 percent or less, and in nearly all instances will provide a product having a moisture content of 12 percent or less. In other words, the product will be completely fried.

After complete frying, frying to a moisture content of less than 12 and typically 3 percent or less, fried farinaceous material is ready for the final step of this invention. The final step is shaping the fried farinaceous dough material before the dough becomes rigid. Typically, this means within about 20 seconds after completion of frying, and preferably within about 10 seconds after completion of frying. Of course, the precise time period available for shaping will depend to a certain extent upon the precise farinaceous material utilized, the frying time, and the starch content of that material. However, the important factor is that shaping after complete frying must be done as quickly as possible before rigidity of the fried dough, believed to be caused by hydrogen bonding of amylose molecules, occurs.

There is no criticality with regard to the shaping, other than the time in which it is completed; accordingly, the precise method of shaping after frying can vary endlessly. For example, an entire farinaceous material dough sheet can be fried, the sheet can be cut into sized portions and shaped, all after complete frying but before the fried dough becomes rigid; the dough material can be formed into portion pieces; the portion pieces can be stacked; the stacked pieces can be be fried, and after complete frying but before the stacked pieces become rigid, a compressing force created by oppositely disposed mating molds positioned at the top and the bottom of the stack can compress the fried portions into a uniform shape conforming to the shape of the molds. As shown in an Example below, this method has worked well to provide uniform saddle-shaped potato chips.

In yet another method, a farinaceous dough material is sheeted, the sheet is cut into specifically desirable shaped pieces (ovals), the oval pieces are passed through a deep fat frying bath while restraining the lateral side portions of said ovals against displacement to provide flat completely fried oval pieces, and after complete frying and before said pieces become rigid the fried ovals are shaped into a uniform saddle shape by conforming said ovals to a saddle shape by applying oppositely disposed mating molds.

While the description given herein has been with specific reference to farinaceous dough materials, and indeed the invention has greatest applicability in this area, it has been found that potato slices can also be shaped shortly after frying. However, because of the lack of uniformity of potato slices, careful control of frying, moisture content, and degree of cooking is difficult.

The following Examples are offered to illustrate but not limit the process of the invention disclosed herein.

EXAMPLE 1

A snack food potato chip was prepared from a potato dough, which is a farinaceous dough, having the following formulation:

| Ingredient | Percentage |
|---|---|
| Potato flour | 59.6 |
| Monoglyceride | .8 |
| Water | 39.6 |

In mixing the above formulation in order to provide a farinaceous potato dough, the monoglyceride was melted and added to the water. This mixture was heated to about 180°F and the potato flour was blended in after which the entire formulation was mixed thoroughly in a small Hobart mixer.

Thereafter a dough sheet was prepared by rapidly passing the dough through a 2-roll mill to provide a coherent workable dough sheet having a thickness of 0.016 inch. The roller mill was operating at a front roll temperature of 150°F and a back roll temperature of 190°F.

The rolled sheet was cut into flat oval shaped pieces which were then placed in 340°F frying oil and allowed to fry freely without constraint. Approximately halfway through the frying cycle the chips were turned to insure relatively even frying.

Attempts to shape the fried chips immediately after completion of frying were made at intervals specified in the Table below. The chips were conformed into a uniform saddle shape by applying oppositely disposed mating molds to opposing lateral faces of the chips.

TABLE I

| | Time Lapse After Complete Frying and Before Shaping | | | |
|---|---|---|---|---|
| | Moisture level after frying and cooling | 5 seconds after removal | 10 seconds after removal | 20 seconds after removal |
| Frying Time | | | | |
| 10 seconds | 4.7% | yes* | yes | yes |
| 20 seconds | 4.1% | yes | yes | no |
| 30 seconds | 2.9% | yes | no | — |
| 40 seconds | 1.9% | no | — | — |

*yes indicates satisfactory shaping to conform to the shaping mold without breakage.

In yet another run a dough of the formulation of this example was fried at 340°F until it reached a moisture content of 9.5 percent and was tested and found to be shapeable 9 seconds after frying.

EXAMPLE 2

A farinaceous dough of the formulation described in Example 1 was prepared and the dough sheet was milled as described in Example 1 to provide a sheet of 0.016 inch thickness. The sheet was cut into ovals which were free-fried in hot oil at a temperature of 340°F.

Substantially similar results as described in Example 1 were obtained in that oppositely disposed mating molds could be applied to the ovals up to 20 seconds after frying to provide shaping of the chip to the configuration of the molds.

When in the above Examples the farinaceous dough was selected from the group consisting of corn, wheat, rice, barley, rye, and mixtures thereof, substantially similar results are obtained.

When in the above example a plurality of cut dough ovals are stacked, and fried as a stack and thereafter shaped after complete frying before the dough pieces become rigid, by applying a compressing force from oppositely disposed mating molds positioned at the top and the bottom of the stack, substantially similar results are obtained in that uniform shaped snack food chips are obtained.

When in the above example portions of farinaceous dough sheet are constrained along their lateral side portions against displacement during frying and subsequently shaped as described in Example 1 before the dough pieces become rigid, substantially similar results are obtained in that a uniform shaped snack food chip is obtained.

What is claimed is:

1. In the process of preparing shaped, crisp snack foods from coherent farinaceous doughs, said process comprising preparing a coherent farinaceous dough, sheeting said dough, cutting said sheet into desired snack food pieces, completely frying said dough pieces in a frying oil to a final moisture content of 12 percent or less, and removing said completely fried dough pieces from the frying oil, the improvement comprising shaping said dough pieces into a desired uniform geometrical shape after removal from the frying oil but before said fried dough pieces become rigid.

2. The process of claim 1 wherein the fried dough has a moisture content of from 1 to 5 percent.

3. The process of claim 1 wherein the fried dough moisture content is 3 percent or less.

4. The process of claim 1 wherein said dough sheet has a thickness of from 0.010 inch to 0.040 inch.

5. The process of claim 4 wherein said sheet thickness is from 0.014 inch to 0.030 inch.

6. The process of claim 1 wherein the farinaceous dough is a dough selected from the group consisting of corn, potatoes, wheat, rice, barley, oats, rye, and mixtures thereof.

7. The process of claim 6 wherein the farinaceous dough is a potato dough.

8. The process of claim 7 wherein the potato is prepared from dehydrated potatoes.

9. The process of claim 8 wherein the potato dough comprises from 20 to 70 percent by weight of moisture.

10. The process of claim 9 wherein the potato dough comprises from 30 to 60 percent by weight of moisture.

11. The process of claim 10 wherein shaping occurs within about 20 seconds after removal of the dough pieces from the frying oil.

12. The process of claim 11 wherein shaping occurred within 10 seconds after removal of the dough piece from the frying means.

13. The process of claim 11 wherein frying is deep fat frying for from 5 seconds to 60 seconds at a temperature above 212°F.

14. The process of claim 13 wherein frying is at a temperature of from 300°F to 375°F for from 7 seconds to 15 seconds.

15. A process of making a uniform shaped potato chip from dehydrated potatoes, said process comprising the steps of:
 a. preparing a coherent workable dough comprising from about 20 to about 70 percent by weight of moisture;
 b. sheeting said dough;
 c. completely frying at least a portion of said dough sheet to a final moisture content of 12 percent or less;
 d. removing said fried dough sheet portion from the frying medium; and
 e. shaping the fried sheet portion into a desired uniform geometrical shape after complete frying and removal from the frying medium, but before the fried dough becomes rigid.

16. A process of making uniform shaped farinaceous material-based snack foods, comprising: preparing a farinaceous dough, forming the dough into a sheet, cutting the dough into pieces, stacking the pieces, completely frying the stacked pieces to a final moisture content of 12 percent or less, removing the fried stacked pieces from the frying medium and thereafter shaping the pieces into a desired uniform geometrical shape by applying, after complete frying and removal from the frying medium but before said pieces become rigid, a compressing force from oppositely disposed mating molds positioned at the top and bottom of said stack.

17. A process of making uniformly shaped farinaceous material-based snack foods, comprising: preparing a dough, sheeting the dough, cutting the sheet into pieces, passing the pieces through a deep fat frying bath, while restraining the lateral side portions thereof against displacement, and after complete frying to a final moisture content of 12 percent or less and removal from the frying medium but before said pieces become rigid, shaping said fried dough pieces into a desired uniform geometrical shape.

* * * * *